Sept. 24, 1935.  M. DENIAU  2,015,217
METHOD BASED UPON THE USE OF VIBRATIONS AND APPARATUS THEREFOR
Filed Nov. 28, 1927   3 Sheets-Sheet 1

M. Deniau
INVENTOR
By: Marks & Clark
ATTYS.

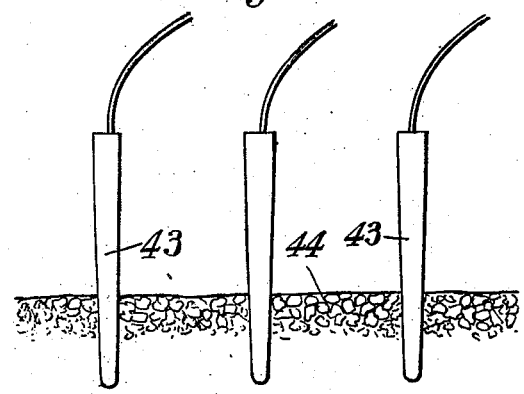
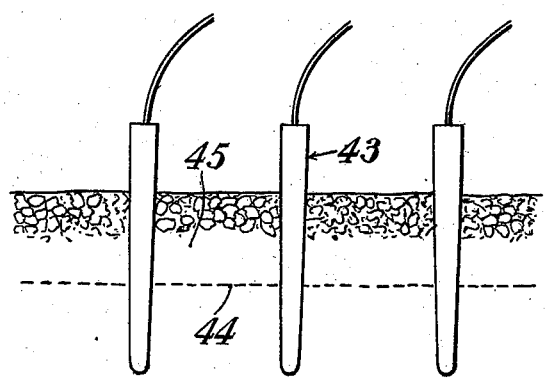
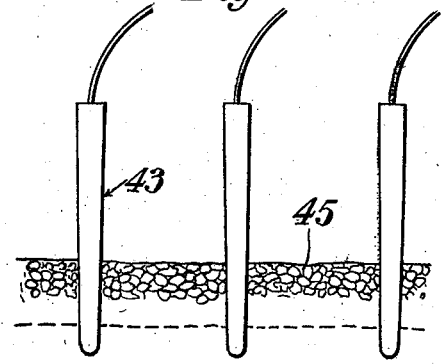

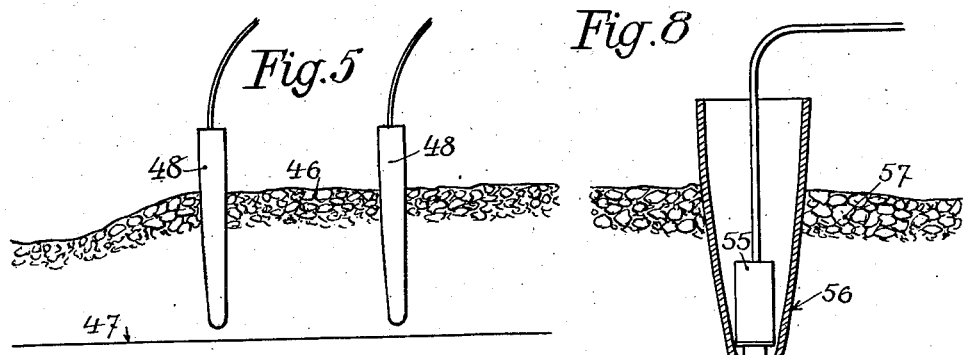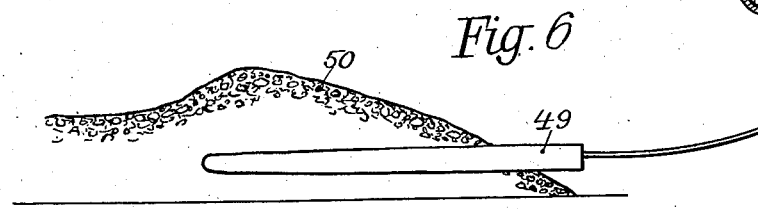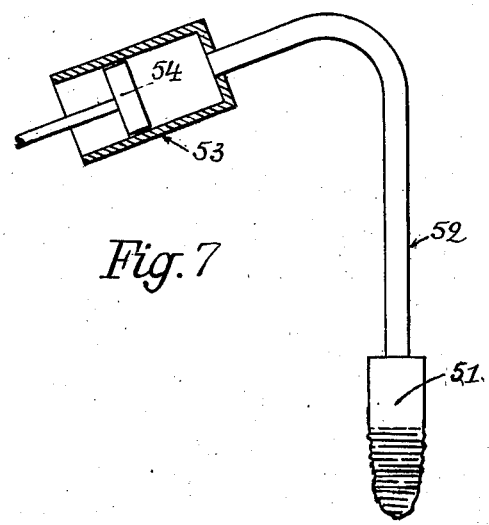

Patented Sept. 24, 1935

2,015,217

UNITED STATES PATENT OFFICE 2,015,217

METHOD BASED UPON THE USE OF VIBRATIONS AND APPARATUS THEREFOR

Marcel Deniau, Paris, France

Application November 28, 1927, Serial No. 236,345
In France December 8, 1926

6 Claims. (Cl. 25—1)

This invention has for its object to provide a method for increasing the fluidity of pasty materials by the use of intense vibrations of high frequency.

The invention essentially consists in that the vibrator or the vibrating body is, at least in part, directly immersed in the material.

One of the manners of putting out consists in that the vibrator is so constructed as to float in the material liquefied by vibration, so that it automatically moves in the material by following the modifications of level of the latter.

The use of vibration for obtaining the settling of pasty or granulous materials such as concrete, materials in pieces, is known. It is especially known to vibrate the material by means of vibrators secured to forms containing the material, or bearing on a plate resting on the material, or by causing armatures, remaining enclosed in the material, to vibrate. It is also known to vibrate the material contained in moulds placed on shaking tables.

The present invention comprises all uses of vibrations which are characterized by a relative displacement, and generally continuous, of the vibrational effect and of the material in use. In general, under the effect of powerful vibrations, the substances which are not liquid will become plastic and may flow out, and may also exercise pressure upon an immerged body. Their adhesion to the walls diminishes, and they will better obey the directive forces such as gravity, centrifugal force, magnetism and the like. I have taken advantage of these effects in certain forms of my apparatus.

The said invention is applicable to all substances and all mixtures which may be subjected to vibration to advantage in order to facilitate their handling and use, for instance in such processes as moulding, agglomeration, settling, classification of component parts, transportation, placing in position, flowing or pouring, insertion of another body and increase in compactness, or purity, or modification of the proportion of the several parts by segregation or otherwise.

The said invention is chiefly applicable to reinforced or ordinary concrete, irrespectively of the binding substance in use, such as cement, asphalt, bitumen or the like, or to wet or dry substances consisting of pieces or particles, such as the products of grinding operations, macadam, ores, ballast, filling material, various powdered substances which may be optionally moulded, or to material which may assume a pasty form such as clay, asphalt, bitumen, tar, pitch, plaster, ceramic products, glass, chocolate, sirups, various pastes adapted to be placed in tubes, paste for the manufacture of matches, and the like; or substances which may assume the liquid form, such as melted metal.

Save for contrary indication, the invention does not relate to the methods by which the vibrations are produceod, and I may employ any suitable apparatus producing vibrations.

I may also add to the vibrational effects all other useful effects such as heat, pressure, centrifugal action, circulation of fluids, or the like.

The following examples of the various uses of my invention are not limitative of the said uses; they are chiefly given to show practical certain methods by which the invention may be carried into effect, which practical methods are covered by the invention. The details of use may vary within wide limits, without departing from the essential principles of the invention.

These examples, for convenience in the description, will relate to cement concrete, ordinary or reinforced, but this is not intended to restrict the scope of the invention.

In all such examples, in addition to the facility or feasibility of construction due to the use of the invention, I obtain for the concrete thus obtained the same characteristics: a great reduction in the amount of binding substance required, due to the closer spacing of the stone pieces, also a greater fluid tightness, and the concrete is less subject to freezing.

If a piece of any suitable shape is inserted into the vibrating concrete and then removed, while the vibration continues, the space left by the said piece will be gradually filled by the adjacent concrete, which is enabled to flow in virtue of the plasticity imparted by the vibration. The said inserted piece may be a vibrator which is so arranged that it may be immerged in the concrete without damage. The apparatus acts in the first place by vibrating the adjacent concrete, and then during the removal it continues its effect and thus causes the concrete to fill the empty space. This result depends upon several conditions which may be readily fulfilled, such as the slow rate of removal, the suitable outer form of the vibrator, and the sufficient plasticity of the concrete when subjected to vibration.

The accompanying drawings illustrate, by way of example, various forms of construction of a vibrating apparatus according to the invention.

Figs. 2, 3 and 4 show other vibrating elements in various positions of use.

Figs. 5 and 6 show two other methods for the use of like vibrating elements.

Fig. 7 is a vertical section of a vibrating device adapted to float in the concrete.

Fig. 8 is a vertical section of a like vibrating device.

Figure 1:
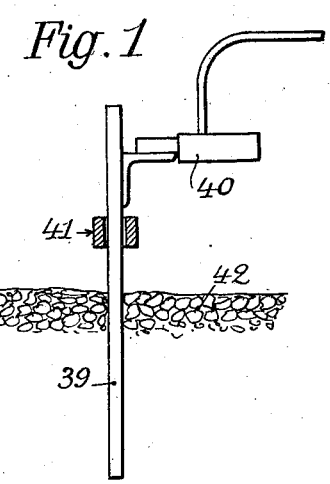
Fig. 1 is an elevational view of a vibrating element adapted for insertion into the concrete.

A vibrator of the type described may consist simply of a bar, strip or plate 39 (Fig. 1) to whose upper part is attached a foundry vibrator 40, known per se. When in use, the apparatus may be suitably directed by a guide 41.

This method of obtaining vibrated concrete by means of a vibrator immersed in the concrete 42 without any intermediate vibration of the mould or form, possesses great advantages, as follows:

(a) The concrete may be vibrated at a distance from all forms or moulds, thus enabling the use of large masses of vibrated concrete, for instance the process is applicable to the construction of dams or barrages in concrete.

(b) Moulded objects of large size may be obtained.

(c) Forms or moulds of a simplified construction may be used, since they are not subjected to the direct action of the vibration.

(d) The number of vibrators which are necessary can now be reduced. When the vibrators are mounted on the form or mould, their number must correspond to the total volume of the concrete under vibration, unless indeed the vibrators are to be frequently displaced, which is a great disadvantage. With the aforesaid process, the number of vibrators will depend solely upon the volume of the part of the concrete which is vibrated at each instant.

(e) The vibrated concrete may be employed in conditions in which it is impossible to secure the vibrators to the moulds, for instance concrete for the filling of wells.

In the device shown in Figs. 2 to 4, the vibrators 43 enter the mass of concrete 44 (Fig. 2). When one portion of the concrete has been vibrated, I place on another layer of fresh concrete 45 (Fig. 3) and then raise the vibrators which act upon the added material (Fig. 4).

Fig. 5 relates to the use of the method for the construction of facings. The concrete 46 is spread to a suitable thickness upon the road bed 47. Before it has settled, it is vibrated by means of the inserted vibrators 48. The process is applied with great facility, and can be used for repair work on limited areas.

In the modification shown in Fig. 6, the vibrators 49 are engaged horizontally in the fresh concrete 50 which is poured upon the place of work. They are gradually displaced while fresh concrete is added so as to obtain the desired thickness of facing.

The use of concrete in connection with immerged vibrators will require the use of very strong and tight vibrators, to prevent these from suffering damage from the concrete. The vibrator which is described as follows, although it might be mounted on a form or mould in order to vibrate it, is chiefly adapted for immerged use. The said vibrator consists essentially of a recipient or conduit with elastic walls; in it is placed or circulated a fluid subjected to a pressure which is varied at a very rapid rate. The said recipient or conduit may have a suitable shape depending upon its use, such as a ring form for the moulding of pipes, or like shapes.

The following is an example of a device which will assure rapid vibrations of pressure in a fluid (Fig. 7). The elastic recipient 51 containing the fluid is connected by a flexible pipe 52 with a pump cylinder containing a piston 54 having a very rapid reciprocating motion; the recipient 51 constitutes the vibrator.

Another particular feature of the invention consists in the fact that the vibrators may be caused to float in the vibrated material.

When a large mass of concrete is to be employed, the concrete is usually added in horizontal layers. If immerged vibrators are to be used, such vibrators must be raised each time the concrete is added. This disadvantage may be obviated by the use of the following device which provides for the automatic lifting. The vibrated concrete is found to act in certain respects after the manner of a liquid. For instance the principle of Archimedes is applicable to a certain degree to bodies immersed in this concrete. For this, it is simply necessary that the bodies shall have a suitable shape, and that the concrete shall be sufficiently plastic. This leads to the construction of a vibrator adapted to float on the surface of the concrete so as to automatically follow the variations in the level of this surface. The weight of said vibrator and its displacement are such that the device will float upon the concrete.

Fig. 8 shows by way of example a device of this type.

The compressed air vibrator 55, of the type used in foundry practice, is protected by a sheath 56 against contact with the concrete. The device is immersed in the concrete 57. The apparatus takes a position corresponding to its weight and to the volume of the concrete displaced. If a layer of fresh concrete is added, the vibrator will rise gradually until it attains a new position of equilibrium, while the vibrated concrete continues to fill the empty space. The pressure exercised by the vibrated concrete upon the vibrator may be utilized for the horizontal displacement of such vibrators.

Due to the plastic condition of the concrete afforded by the vibration, the stiffening members can be inserted and put in place. The vibration is continued for a few moments after the said members are placed in position, so that they will be well covered. When the vibration ceases or is farther removed (in the process according to the invention), the stiffening parts will be firmly held in place.

Having thus described my process and apparatus, what I claim as new therein, and my own invention, is:—

1. An apparatus for the vibration of pasty or like material, which comprises a hollow body whose bottom part has a convex form and is adapted to enter and to float upon the said material, and means whereby the said hollow body may be set in vibration.

2. Process for the vibration of concrete or of a material similar to concrete, by means of a vibrating body in contact with the said material, this process being characterized in that the said body is immersed at least partially in the said material, that a vibratory power sufficiently high for liquefying the pasty surrounding material is applied thereto, that fresh material is gradually added on to the material already vibrated, and that the said vibrating body is allowed to rise with the level of the material.

3. Process for the vibration of a pasty or like material which consists in placing in this material a vibrator adapted to float in the said material when the latter is rendered fluid by vibration, in applying to this vibrator a power sufficient for liquefying the surrounding material, and in progressively adding fresh material on to the vibrated material.

4. Vibrator for vibrating a pasty material comprising a hollow body and means for causing this body to vibrate, the whole being characterized in that its weight and its volume are in suitable relation in order that it may float in the vibrated material under the lifting thrust of this material when the latter is rendered fluid.

5. Method for vibrating concrete or a similar material having at rest a fluidity which is very small or null by means of a vibrating body in contact with the said material, which consists in immersing the said body, at least partially, in the said material, in causing it to vibrate with sufficient intensity in order to render the surrounding material substantially fluid, and in progressively moving the said vibrating body in the material.

6. Method for vibrating concrete or a similar material having at rest a fluidity which is very small or null by means of a vibrating body in contact with the said material, which consists in immersing the said body, at least partially, in the said material, in causing it to vibrate with sufficient intensity in order to render the surrounding material substantially fluid, in progressively moving the said vibrating body in the material, and in withdrawing it therefrom sufficiently slowly in order that the vibrated material should fill up, in proportion to the withdrawal of the vibrating body, the space left by the latter.

MARCEL DENIAU.